United States Patent
Kosaka

(10) Patent No.: US 6,865,903 B2
(45) Date of Patent: Mar. 15, 2005

(54) ARRANGEMENT STRUCTURE FOR PROTECTING A DRAIN HOSE OF A VEHICULAR AIR CONDITIONING CASE

(75) Inventor: Mitsuru Kosaka, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/646,561

(22) Filed: Aug. 21, 2003

(65) Prior Publication Data

US 2004/0040330 A1 Mar. 4, 2004

(30) Foreign Application Priority Data

Aug. 29, 2002 (JP) ........................................ 2002-251059

(51) Int. Cl.⁷ ............................. B60H 1/32; F25D 21/14
(52) U.S. Cl. .......................................... 62/285; 62/244
(58) Field of Search .......................... 62/285, 244, 241, 62/286, 290, 291

(56) References Cited

FOREIGN PATENT DOCUMENTS

| JP | 56053914 A | * | 5/1981 | ............ B60H/3/04 |
| JP | 5-1583 | | 1/1993 | |
| JP | 07329552 A | * | 12/1995 | ............ B60H/1/32 |
| JP | 09136533 A | * | 5/1997 | ............ B60H/1/32 |

* cited by examiner

*Primary Examiner*—Chen Wen Jiang
(74) *Attorney, Agent, or Firm*—Harness, Dickey & Pierce, PLC

(57) ABSTRACT

In a arrangement structure of a drain hose that drains water from an air conditioning case to an outside of a vehicle, the drain hose is disposed to extend along a silencer provided in the inside of the vehicle. The silencer is formed with a depression and the drain hose is arranged in the depression. Thus, loads such as by passenger's feet and baggage are received by the silencer, thereby reducing crush of the drain hose. The drain hose can be made of rubber and is flexibly shaped along its arrangement route. Accordingly, the drain hose does not need separate flexible joint members at positions corresponding to bends in the arrangement route. Since the drain hose is supported in the depression, fixing members for fixing the drain hose are not required.

14 Claims, 4 Drawing Sheets

ARRANGEMENT STRUCTURE FOR PROTECTING A DRAIN HOSE OF A VEHICULAR AIR CONDITIONING CASE

CROSS REFERENCE TO RELATED APPLICATION

This application is based on Japanese Patent Application No. 2002-251059 filed on Aug. 29, 2002, the disclosure of which is incorporated herein by reference.

FIELD OF THE INVENTION

The present invention relates to an arrangement structure for protecting a drain hose of an air conditioning case mounted on a vehicle.

BACKGROUND OF THE INVENTION

An air conditioning case of a vehicle, which defines an air passage therein, is generally arranged in the inside of an instrument panel of the vehicle. In the air conditioning case, water that condenses on a heat exchanger for cooling and rainwater that enters from an outside air introduction port exist. A drain hose is generally connected to the air conditioning case to drain such water from the air conditioning case to an outside of the vehicle.

An arrangement of the drain hose is usually limited by the layout of the vehicle. In some cases, the drain hose has to be arranged at positions where it is easily pressed or crushed by passenger's feet and luggage in a passenger compartment. If the drain hose is crushed and it is maintained for long periods of time, it is clogged. As a result, the water leaks from the air conditioning case to the passenger compartment.

To address such problem, it is proposed to use a hard pipe as the drain hose. Because the hard pipe does not have adequate flexibility, it needs a flexible joint member such as a rubber hose at a position corresponding to a corner or a bend in its arrangement route. Therefore, it results in increases in the numbers of component parts and manufacturing steps.

SUMMARY OF THE INVENTION

It is an object of the present invention to provide an arrangement structure capable of reducing a load to a drain hose, which drains water from an air conditioning case mounted on a vehicle, without increases in the numbers of component parts and manufacturing steps.

According to an arrangement structure of the present invention, a drain hose, which drains water from a vehicular air conditioning case to an outside of a vehicle, is disposed along a wall member in a passenger compartment. The wall member is formed with a depression and the drain hose is arranged in the depression.

Accordingly, loads such as by passenger's feet and baggage are received by the wall member, so the stress to the drain hose reduces. Therefore, crush of the drain hose reduces. Since the drain hose can maintain a drainage area therein, leakage of the water from the air conditioning case to the passenger compartment reduces.

Since the crush of the drain hose reduces, the drain hose can be formed of a flexible member such as rubber. Thus, the drain hose does not need separate flexible joint members at bends in its arrangement route. Further, since the drain hose is held in the depression of the wall member, it does not need a separate fixing member. Accordingly, the drain hose is protected without increasing the numbers of component parts and manufacturing steps.

Alternatively, the drain hose is disposed to extend along a surface of the wall member and to oppose a protecting member in the passenger compartment. The protecting member is provided as a part of an under cover, which is arranged under an instrument panel of the vehicle.

Because the drain hose is protected by the protecting member, it is less likely to receive the loads. Also, the protective member is provided as the part of the under cover. Accordingly, the arrangement structure protects the drain hose without increases in the numbers of component parts and manufacturing steps.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

The embodiment of the present invention will be described hereinafter with reference to drawings.

Figure 1:
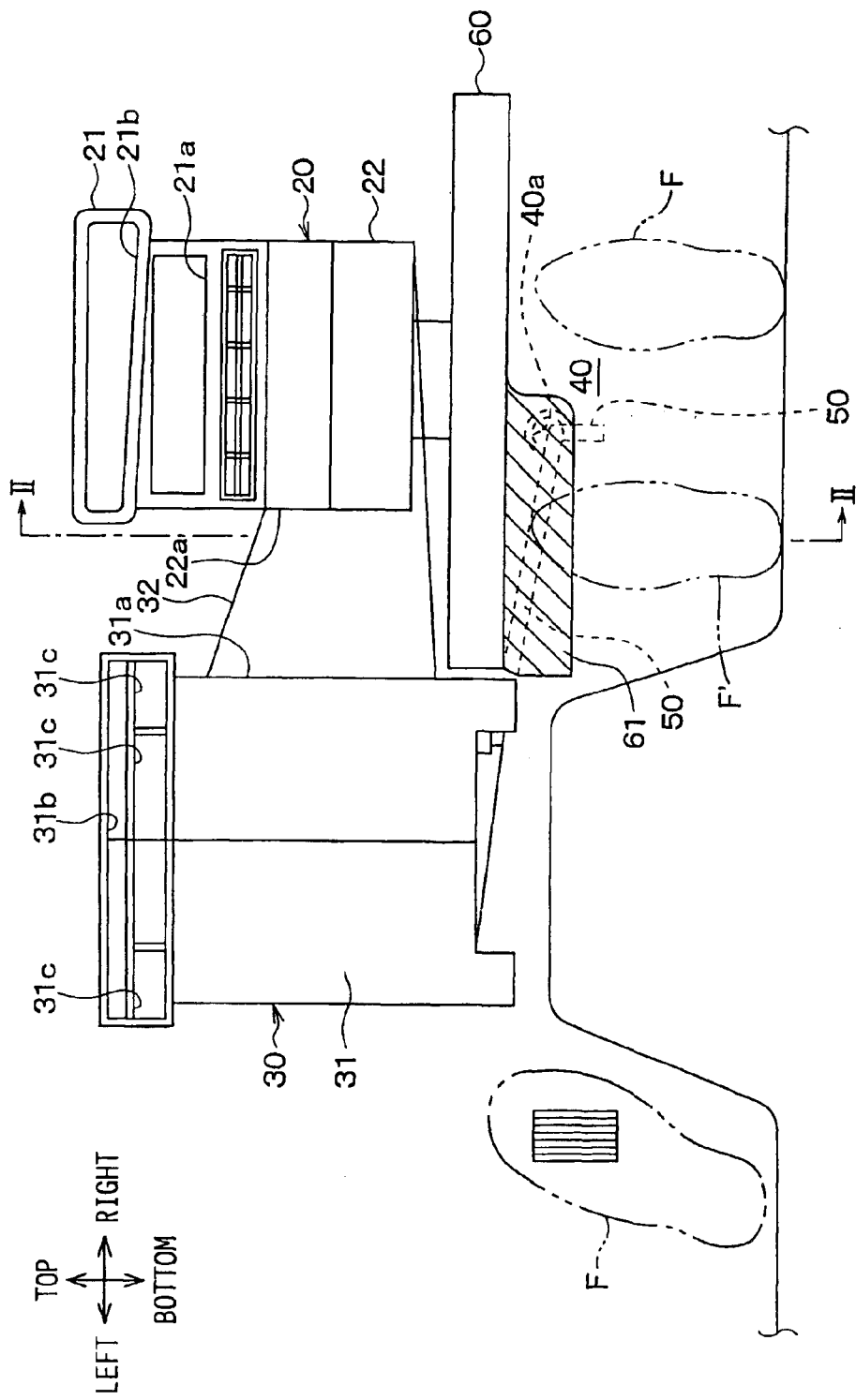
FIG. 1 is a schematic view of an air conditioning unit and a blower unit, when viewed from a passenger compartment, for showing an arrangement of a drain hose according to an embodiment of the present invention.
Figure 2:
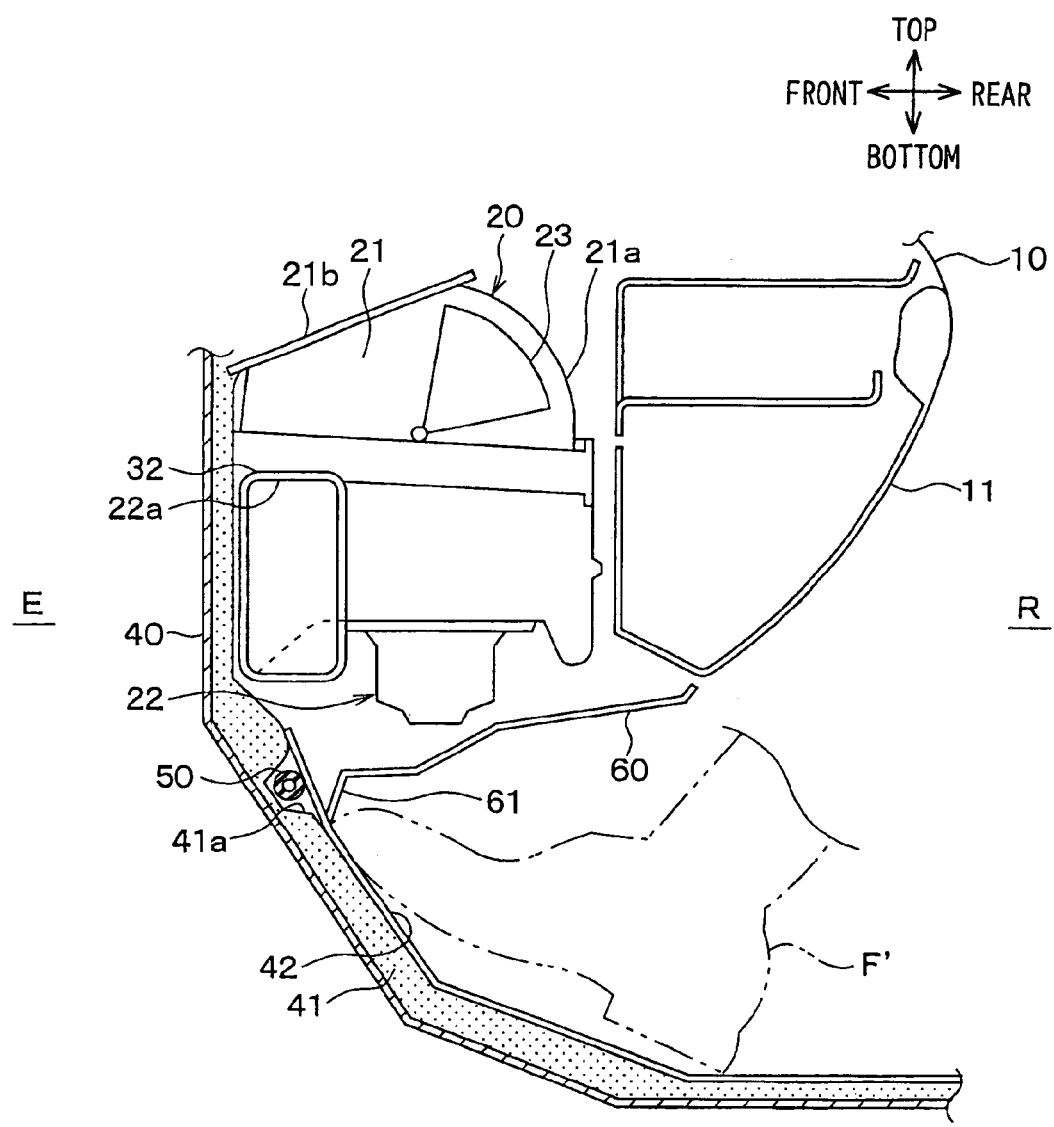
FIG. 2 is a cross-sectional view of a front side of the passenger compartment taken along a line II—II in FIG. 1.
Figure 3:
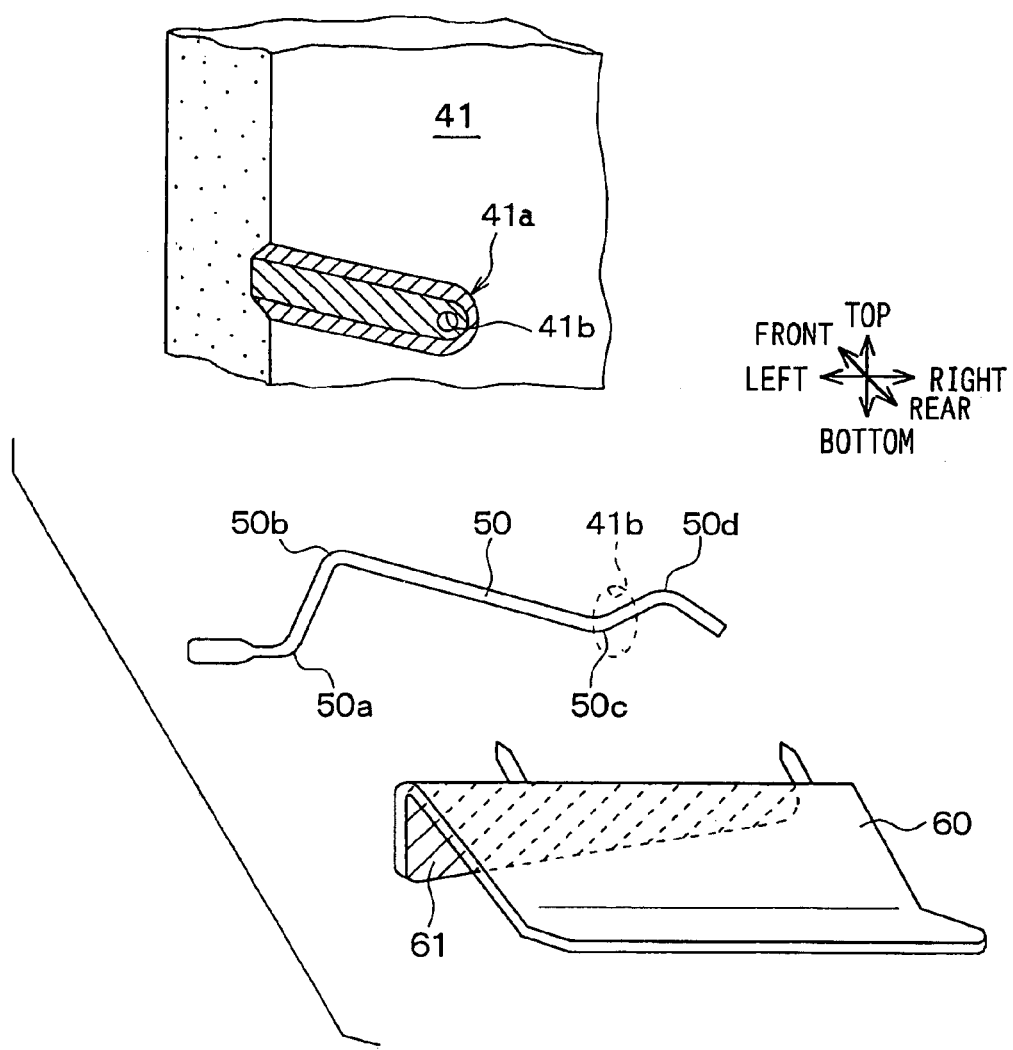
FIG. 3 is an exploded perspective view of a silencer, the drain hose and an under cover according to the embodiment of the present invention.

An arrangement structure for protecting a drain hose of an air conditioning case of a vehicle is employed for a drain hose that is disposed to extend along a partition wall, which separates a passenger compartment from an engine compartment. FIG. 1 shows an arrangement of the drain hose 50 when it is viewed from the passenger compartment. In FIGS. 1 through 3, top/bottom, left/right and front/rear arrows denote an actual arrangement direction of an air conditioning apparatus and the drain hose 50.

As shown in FIG. 1, a blower unit 20 and an air conditioning unit 30, which construct the air conditioning apparatus, are arranged in an inside space of an instrument panel 10. The instrument panel 10 is located on a front side of a passenger compartment R. The blower unit 20 and the air conditioning unit 30 are fixed to a partition wall 40 that separates the passenger compartment R from an engine compartment E.

A vehicle shown in FIGS. 1 and 2 has a handle on the left side. The air conditioning unit 30 is arranged in substantially a middle position in a vehicle left and right direction. The blower unit 20 is arranged next to the air conditioning unit 30 on a passenger's seat side. In FIGS. 1 and 2, chain double-dashed lines F, F' show general positions of passenger's foot. In FIG. 2, numeral 11 denotes a glove box that is provided in the instrument panel 10 in front of the passenger seat.

The blower unit 20 includes an inside and outside air switching box 21 and a blower 22. The box 21 is formed with an inside air introduction port 21a through which air inside the passenger compartment R is introduced and an outside air introduction port 21b through which outside air outside the passenger compartment R is introduced. Also, an inside and outside air switching door 23 is rotatably supported in the box 23. The door 23 selectively opens and closes the inside air introduction port 21a and the outside air introduction port 21b.

The air conditioning unit 30 includes an air conditioning case 31 that defines an air passage through which air flows. Although not illustrated, the air conditioning case 31 for example encases an evaporator as a heat exchanger for cooling, a heater core as a heat exchanger for heating, a temperature control device, an air blow mode switching device and the like. The air conditioning case 31 is formed with a defroster air port 31b, a face air port 31c and a foot air port (not shown).

An air outlet port 22a of the blower unit 22 and an air inlet port 31a are connected by a connecting duct 32. The blower 22 draws air from the inside and outside air introduction ports 21a, 21b and blows it. The air flows into the air conditioning case 31 through the duct 32. The temperature of the air is conditioned while the air passes through the evaporator, the heater core and the like. Then, the conditioned air is blown into the passenger compartment R from the defroster air port 31b, the face air port 31c and the foot air port, which are selected by the air blow mode switching device.

In the air conditioning case 31, water condensing on the evaporator and water such as rainwater entering from the outside air introduction port 21b exist. A drain hole (not shown) is formed at a bottom portion of the air conditioning case 31 so that the water drains away from the case 31. A drain hose 50 is disposed such that its first end is connected to the drain hole of the air conditioning case 31 and its second end passes through a hole 40a formed in the partition wall 40, so that the water flows from the air conditioning case 31 toward the engine compartment E by its gravity force through the drain hose 50.

The drain hose 50 has a shape that it extends from the air conditioning case 31 to the engine compartment E. Specifically, the drain hose 50 extends from the drain hole of the air conditioning case 31 to the underneath of the blower unit 20 along the partition wall 40, via a front position of the passenger foot F'. The drain hose 50 passes through the hole 40a and extends into the engine compartment E. The drain hose 50 is made of a material having high flexibility. For example, the drain hose 50 is made of rubber.

As shown in FIG. 2, a silencer 41 is arranged on the partition wall 40 on the passenger compartment side. Further, a carpet 42 is arranged on a surface 41c of the silencer 41, which faces the passenger compartment R. Here, the silencer 41 forms a wall member of the arrangement structure of the drain hose 50.

Also, the silencer 41 functions as an insulator for insulating the passenger compartment R from noise generated in the engine compartment E. In the embodiment, the silencer 41 is constructed of layers of a sound insulator, a sound absorber, and a damping material in the order from the passenger compartment side to the engine compartment side.

The damping material is to reduce vibrations of the wall 40, which is made of metal, due to noise generated in the engine compartment E. The damping material is for example formed of an asphalt sheet. The sound absorber is to reduce a sound level by converting energy of the sound to a small amount of thermal energy. The sound absorber is for example made of fiber such as felt. The damping material is to insulate the sound from the engine compartment E by reflecting it. The damping material is for example a skin layer made of vinyl chloride.

The drain hose 50 is interposed between the silencer 41 and the carpet 42, as shown in FIG. 2. The silencer 41 is formed with a depression 41a at a position where the drain hose 50 is arranged. In the embodiment, the depression 41a is formed by compressing the sound absorber. Specifically, the depression 41a is dented from the surface 41c toward the engine compartment E. The drain hose 50 is arranged in the depression 41a and is covered with the carpet 42.

An under cover 60 is provided under the blower unit 20 and the connecting duct 32 so that the inside of the instrument panel 10 is covered from the lower side. The under cover 60 is made of resin having predetermined rigidity so that it maintains the shape by itself. The under cover 60 is integrally formed with a resinous protecting portion (protecting member) 61. The protecting member 61 is disposed to oppose and cover the drain hose 50.

FIG. 3 shows an exploded perspective view of the silencer 41, the drain hose 50 and the under cover 60. In FIGS. 1 and 3, shaded areas of the cover 60 show the protecting portions 61. Also, in FIG. 3, a shaded area of the silencer 41 shows the depression 41a. In FIG. 3, numeral 41b denotes a through hole formed in the silencer 41 at a position corresponding to the through hole 40a of the partition wall 40.

The drain hose 50, which is made of rubber, is bent at positions denoted by numerals 50a, 50b, 50c, and 50d to correspond to bends in an arrangement route of the drain hose 50. A first portion of the drain hose 50, which is a portion from the bend 50b to the bend 50c, is arranged in the depression 41a. A second portion of the drain hose 50, which is a portion from the bend 50c to the bend 50d, is arranged in the engine compartment E.

Accordingly, since the first portion of the drain hose 50 is located in the depression 41a of the silencer 41, loads applied by such as passenger's feet and baggage are received by the top surface 41c of the silencer 41. Because the drain hose 50 does not receive the loads, the drain hose 50 is less likely to be crushed, even if it is made of rubber.

Because the drain hose 50 is flexibly shaped, it does not need flexible joint members at the positions corresponding to the bends in the arrangement route. Further, since the first portion of the drain hose 50 is received in the depression 41a, the position of the drain hose 50 is fixed by the depression 41a. Thus, fixing members for fixing the drain hose 50 are not required. In addition, the drain hose 50 is also protected by the protecting portion 61, which is provided as a part of the under cover 60. Accordingly, this arrangement structure reduces crush of the drain hose 50 without increasing the numbers of component parts and manufacturing steps.

In addition, the drain hose 50 is formed into a single rubber hose that extends from the air conditioning case 31 to the engine compartment E. Thus, flexible joint members as separate parts are not required through the overall arrangement route of the drain hose 50.

The wall member of the arrangement structure is not limited to the silencer 41 of the partition wall 40. For example, a silencer arranged on a floor panel, which is provided as floor reinforcing member, can be used as the wall member. The wall member is not limited to the silencers. For example, the depression 41a for receiving the drain hose 50 can be formed in the carpet 42, in place of the silencer 41. Alternatively, the depression 41a can be formed in the partition wall 40.

The wall member can be applied to a member that easily receives the loads and may cause damage to the drain hose 50. That is, the arrangement structure is not limited to the passenger foot area in the vehicle, but applied to another area such as a ceiling or pillars, which extend from the ceiling downwardly.

The drain hose 50 has flexibility from the first end to the second end, that is, through the overall arrangement route. Instead, the drain hose 50 can be provided by a hose that has flexibility at least at a portion held in the depression 41a.

In the above-described embodiment, the air conditioning case 31 is arranged in the inside of the instrument panel 10. However, the arrangement of the air conditioning case 31 is not limited to the above. For example, the arrangement structure of the present invention can be applied to a vehicle that has the air conditioning case 31 on the ceiling or side trims.

Figure 4:
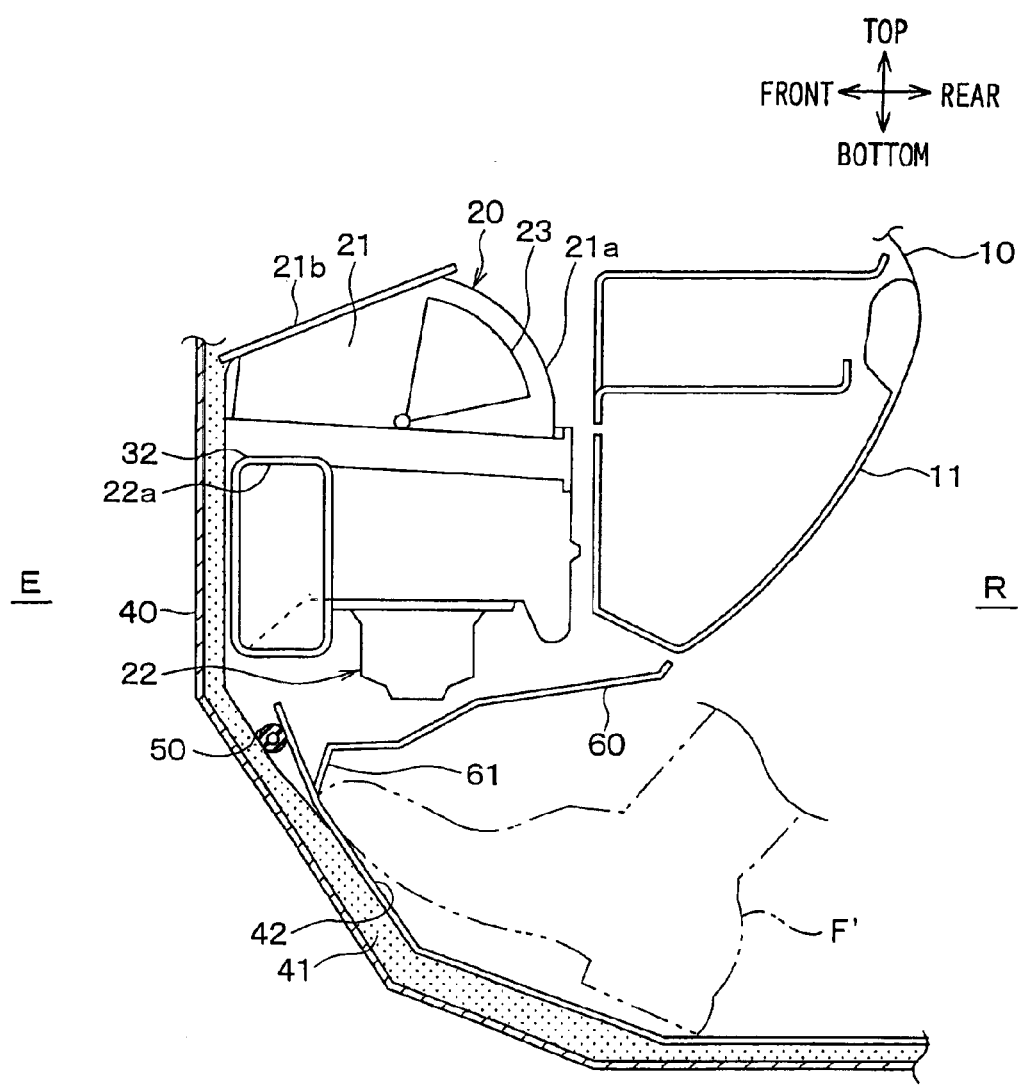
FIG. 4 is a cross-sectional view of the front side of the passenger compartment according to a modification of the embodiment of the present invention.

It is not always necessary to protect the drain hose 50 by both the protecting portion 61 of the under cover 60 and the depression 41a. The protecting portion 61 can be eliminated and the drain hose 50 can be protected only by the depression 41a. Instead of the depression 41a, the drain hose 50 can be protected by the protecting portion 61, which protrudes from the under cover 60 and opposes the drain hose 50, as shown in FIG. 4. In this case, the drain hose 50 is for example arranged to extend along the surface of the carpet 42 or the partition wall 40. The drain hose 50 can be arranged to extend along the floor panel, which substantially horizontally extends from the partition wall 40. Also, the drain hose 50 can be arranged to extend along the silencer provided on the floor panel and the floor carpet.

In FIG. 2, the first portion of the drain hose 50 is completely held in the depression 41a. However, at least the engine compartment side of the drain hose 50 can be held in the depression 41a. The passenger compartment side of the drain hose 50 may be disposed outside of the depression 41a. In this case, it may be difficult to completely protect the drain hose 50 from crushing. However, the loads applied to the drain hose 50 can be reduced, so the crush of the drain hose 50 decreases. Thus, because the drain hose 50 is not completely crushed, the drainage space of the drain hose 50 is maintained. Thus, leakage of the water from the air conditioning case 31 to the passenger compartment R reduces.

The present invention should not be limited to the disclosed embodiments, but may be implemented in other ways without departing from the spirit of the invention.

What is claimed is:

1. An arrangement structure comprising:
   an air conditioning case mounted on a vehicle, the air conditioning case defining an air passage therein;
   a drain hose that drains water from the air conditioning case; and
   a wall member provided in a passenger compartment of the vehicle, wherein the wall member is formed with a depression and the drain hose is disposed in the depression in the passenger compartment.

2. The arrangement structure according to claim 1, wherein the wall member is included in a sound insulator that reduces propagation of sound into the passenger compartment.

3. The arrangement structure according to claim 2, wherein the sound insulator is arranged on one of a partition wall that separates the passenger compartment from an engine compartment and a floor panel that substantially horizontally extends from the partition wall.

4. The arrangement structure according to claim 1, further comprising:
   a protecting member disposed in the passenger compartment to oppose the drain hose,
   wherein the protecting member is provided as a part of an under cover that is arranged under an instrument panel of the vehicle to cover an inside of the instrument panel,
   wherein the air conditioning case is arranged in the inside of the instrument panel.

5. The arrangement structure according to claim 1, wherein the drain hose is made of rubber, wherein a first end of the drain hose is connected to the air conditioning case and a second end of the drain hose is disposed on the outside of the passenger compartment.

6. The arrangement structure according to claim 1, wherein the depression is formed on a surface of the wall member that faces to an inside of the passenger compartment.

7. An arrangement structure comprising:
   an air conditioning case defining an air passage therein, wherein the air conditioning case is disposed in an inside space of an instrument panel in a passenger compartment of a vehicle;
   a drain hose provided in a passenger compartment to drain water from the air conditioning case, wherein the drain hose is disposed to extend along a wall member of the passenger compartment; and
   a protecting member disposed to oppose the drain hose in the passenger compartment, wherein the protecting member is provided as a part of an under cover that is arranged under the instrument panel to cover the inside space of the instrument panel; wherein
   the drain hose is disposed between a partition wall and a carpet when the drain hose is above the protecting member.

8. The arrangement structure according to claim 7, wherein the wall member is included in one of the partition wall that separates the passenger compartment from an engine compartment of the vehicle, a sound insulator provided on the partition wall, and the carpet provided on the sound insulator.

9. The arrangement structure according to claim 7, wherein the wall member is included in one of a floor panel of the vehicle that substantially horizontally extends from the partition wall separating the passenger compartment from an engine compartment, a sound insulator provided on the floor panel, and the carpet provided on the sound insulator.

10. The arrangement structure according to claim 7, wherein the drain hose is made of rubber, wherein the drain hose is disposed such that its first end is connected to the air conditioning case and its second end is on the outside of the passenger compartment.

11. An arrangement structure comprising:
    an air conditioning case defining an air passage therein, wherein the air conditioning case is disposed in an inside space of an instrument panel in a passenger compartment of a vehicle;
    a drain hose provided in a passenger compartment to drain water from the air conditioning case, wherein the drain hose is disposed to extend along and through a generally planar surface defined by a wall member of the passenger compartment; and a protecting member disposed to oppose the drain hose in the passenger compartment, wherein the protecting member is provided as a part of an under cover that is arranged under the instrument panel to cover the inside space of the instrument panel.

12. The arrangement structure according to claim 11, wherein the wall member is included in one of the partition wall that separates the passenger compartment from an engine compartment of the vehicle, a sound insulator provided on the partition wall, and the carpet provided on the sound insulator.

13. The arrangement structure according to claim 11, wherein the wall member is included in one of a floor panel of the vehicle that substantially horizontally extends from the partition wall separating the passenger compartment from an engine compartment, a sound insulator provided on the floor panel, and the carpet provided on the sound insulator.

14. The arrangement structure according to claim 11, wherein the drain hose is made of rubber, wherein the drain hose is disposed such that its first end is connected to the air conditioning case and its second end is on the outside of the passenger compartment.

* * * * *